US011458713B2

(12) United States Patent
Spahr et al.

(10) Patent No.: US 11,458,713 B2
(45) Date of Patent: Oct. 4, 2022

(54) FILM LAMINATES BASED ON POLYARYLETHERKETONES (71) Applicant: Arkema Inc., King of Prussia, PA (US)

(72) Inventors: Timothy A. Spahr, Galesville, WI (US); Shawn Cissell, Wauwatosa, WI (US)

(73) Assignee: Arkema Inc., King of Prussia, PA (US)

( * ) Notice: Subject to any disclaimer, the term of this patent is extended or adjusted under 35 U.S.C. 154(b) by 122 days.

(21) Appl. No.: 16/979,546

(22) PCT Filed: Mar. 8, 2019

(86) PCT No.: PCT/US2019/021357
§ 371 (c)(1),
(2) Date: Sep. 10, 2020

(87) PCT Pub. No.: WO2019/177891
PCT Pub. Date: Sep. 19, 2019

(65) Prior Publication Data
US 2020/0406595 A1    Dec. 31, 2020

Related U.S. Application Data (60) Provisional application No. 62/642,060, filed on Mar. 13, 2018.

(51) Int. Cl.
B32B 7/12        (2006.01)
B32B 27/28       (2006.01)
B32B 7/027       (2019.01)
B32B 27/08       (2006.01)
B32B 37/18       (2006.01)

(52) U.S. Cl.
CPC ............ B32B 27/285 (2013.01); B32B 7/027 (2019.01); B32B 27/08 (2013.01); B32B 37/182 (2013.01); B32B 2307/702 (2013.01); B32B 2307/704 (2013.01); B32B 2457/00 (2013.01)

(58) Field of Classification Search
CPC ....... B32B 7/027; B32B 27/08; B32B 27/285; B32B 37/182; B32B 2307/702; B32B 2307/704
See application file for complete search history.

(56) References Cited

U.S. PATENT DOCUMENTS

| | | | |
|---|---|---|---|
| 3,666,612 A | 5/1972 | Angelo | |
| 3,791,909 A | 2/1974 | McKee | |
| 3,989,561 A | 11/1976 | Cotton | |
| 4,816,556 A | 3/1989 | Gay et al. | |
| 4,937,135 A | 6/1990 | Bloom | |
| 5,049,340 A | 9/1991 | Moss et al. | |
| 5,106,673 A | 4/1992 | Effenberger et al. | |
| 5,219,642 A | 6/1993 | Meakin et al. | |
| 5,304,413 A | 4/1994 | Bloom et al. | |
| 5,328,744 A | 7/1994 | Kaufmann et al. | |
| 5,399,434 A | 3/1995 | Katz et al. | |
| 5,731,088 A | 3/1998 | La Court | |
| 8,043,704 B2 | 10/2011 | Berry et al. | |
| 8,158,245 B2 | 4/2012 | Pratte et al. | |
| 9,683,100 B2 | 6/2017 | Bertelo et al. | |
| 2009/0117356 A1 | 5/2009 | Hsu et al. | |
| 2011/0097575 A1 | 4/2011 | Pratte et al. | |
| 2012/0028036 A1 | 2/2012 | Bertelo et al. | |
| 2012/0196113 A1 | 8/2012 | Blaschke et al. | |
| 2018/0371192 A1 | 12/2018 | Roger et al. | |
| 2020/0157299 A1 | 5/2020 | Roger et al. | |

FOREIGN PATENT DOCUMENTS

WO    WO 2011/144933 A1    11/2011

OTHER PUBLICATIONS

Cortes, et al. "Morphology and dynamical mechanical properties of poly ether ketone ketone (PEKK) with metal phenyl links", Journal of Applied Polymer Science, vol. 133, issue 19, Feb. 2, 2016 ( article No. 43396, pp. 1-10).

*Primary Examiner* — Elizabeth E Mulvaney (74) *Attorney, Agent, or Firm* — Lynn B. Morreale (57) ABSTRACT Film laminates containing a layer of a lower melting polyaryletherketone and a layer of a higher melting polyaryletherketone adhered to each other are resistant to heat, wear, moisture, weathering and chemicals and are useful for producing articles such as laminated electronic circuits, flexible heaters, insulated wire and cable, radio frequency identification tags and labeled articles.

25 Claims, 1 Drawing Sheet

FILM LAMINATES BASED ON POLYARYLETHERKETONES

CROSS-REFERENCE TO RELATED APPLICATIONS

This application is a national stage application under 35 U.S.C. § 371 of PCT/US2019/021357 filed Mar. 8, 2019, which claims benefit to U.S. patent application Ser. No. 62/642,060, filed Mar. 13, 2018.

FIELD OF THE INVENTION

The present invention relates to laminates of film layers based on polyaryletherketones, in particular polyetherketoneketones, as well as articles containing such film laminates and methods for preparing and using such film laminates.

BACKGROUND OF THE INVENTION

Currently, various types of polymeric laminates are utilized in applications requiring a high degree of resistance to high temperatures, chemicals and/or wear. PI/FEP laminates represent one such type of polymeric laminate, wherein polyimide (PI) is used as the base (outer) layer and fluorinated ethylene propylene polymer (FEP) is used as the adhesive layer to adhere the laminate to a substrate surface. Such PI/FEP laminates, which are described for example in U.S. Pat. Nos. 3,791,909; 3,989,561; 5,106,673; 5,399,434; and 5,731,088, are employed in the fabrication of laminated electronic circuits, flexible heaters and insulated wire and cable. This type of polymeric laminate has certain deficiencies, however. For example, while the continuous use temperature of the polyimide is generally around 300° C., the continuous use temperature of the fluorinated ethylene propylene polymer is much lower (about 205° C.). This means that laminates comprised of these materials have a heat resistance limited by the FEP layer (i.e., a continuous use temperature of not more than about 205° C.). Further, polyimide is relatively hygroscopic. Exposure of a laminate containing polyimide in its base layer to high humidity conditions will cause it to absorb water, limiting the polyimide's effectiveness as an insulative material. Although polymers are known which are less hygroscopic than polyimide, they generally lack the heat resistance, chemical resistance and wear resistance exhibited by PI. Finally, current manufacturers of laminated electronic circuits, flexible heaters, insulated wire/cable and the like which incorporate PI/FEP laminates possess processing equipment specifically designed to handle PI/FEP laminates, wherein the laminating process for PI/FEP requires equipment that is heated to temperatures between 280° C. and 360° C. Ideally, improved film laminates which replace PI/FEP laminates would be capable of being processed on the same existing equipment.

Thus, the development of film laminates which are capable of replacing PI/FEP laminates and overcome or address the known deficiencies of such laminates while at least substantially maintaining their favorable characteristics (e.g., high temperature resistance, high chemical resistance, and high wear resistance) would be very desirable.

Laminate or composite structures in which one or more layers of a laminate or composite are comprised of a polyaryletherketone are known in the art. U.S. Pat. No. 8,158,245 describes thermoplastic composites having a core composite layer, which includes a fibrous substrate and one or more high performance polymers (such as a polyaryletherketone), and a surface layer polymer applied to at least one surface of the core composite layer. U.S. Pat. No. 9,683,100 discloses assemblies containing polyetherketoneketone tie layers, which are used to join substrates to form laminates. U.S. Pat. No. 4,937,135 describes a thermoformable laminate comprising a polyaryletherketone sheet and a polyvinyl alcohol film. In U.S. Pat. No. 8,043,704, a clear, layered thermoplastic material is disclosed which consists of a relatively thick inner polymeric layer and thin, transparent outer polymeric layers in intimate contact with sides of the inner polymeric layer, wherein the outer polymeric layers are film materials such as polyetherketoneketone and polyetheretherketone. U.S. Pat. No. 5,328,744 teaches a laminate comprising polyetherketoneketone and para-aramid. U.S. Pat. No. 5,049,340 describes a process for manufacturing a film of amorphous polyetherketoneketone and the use of such a film as a component layer of a laminate. EP 2571688 discloses a composite insulating tape comprising a laminate or coextrusion of at least two layers, wherein one of the layers is a layer of polyetheretherketone or polyetherketoneketone. A laminate of a thin layer of PVF and a thick layer of amorphous polyetherketoneketone is taught by U.S. Pat. No. 5,304,413. U.S. Patent Publication No. 2012/0196113 mentions that a foil made from a composition containing polyaryletherketone can be laminated onto a metal sheet using various types of adhesives.

SUMMARY OF THE INVENTION

In one embodiment, the present invention provides a film laminate comprised of:
  a) a first film layer comprised of a first polyaryletherketone (e.g., a polyetherketoneketone) having a melting point (in various embodiments, the melting point of the first polyaryletherketone is not more than 350° C., not more than 340° C., not more than 330° C., not more than 320° C., or not more than 310° C.); and
  b) a second film layer comprised of a second polyaryletherketone (e.g., a polyetherketoneketone) having a melting point at least 25° C. higher (e.g., at least 30° C. higher, at least 35° C. higher, at least 40° C. higher, at least 45° C. higher or at least 50° C. higher) than the melting point of the first polyaryletherketone;
    wherein the first film layer and the second film layer are directly adhered to each other.

Another embodiment of the invention provides an article (such as a laminated electronic circuit, flexible heater, insulated wire or cable, radio frequency identification tag or labeled article) comprised of a substrate (such as a polymeric substrate, metallic substrate, ceramic substrate or a composite thereof) having a surface and the above-described film laminate, wherein the first film layer is adhered to the surface of the substrate. For example, the substrate may have a first surface and a second surface wherein a first portion of the film laminate is adhered to the first surface of the substrate and a second portion of the film laminate is adhered to the second surface of the substrate, the first portion and the second portion of the film laminate cooperating so as to encapsulate the substrate.

By virtue of both layers of the film laminate being constructed of polyaryletherketones having a high degree of resistance to heat, wear, abrasion, moisture, chemicals and the like, the underlying substrate may be desirably protected from such environmental conditions. Moreover, as a consequence of having similar chemical compositions (i.e., both layers of the film laminate are based on polyaryletherketones of one type or another), the first and second film layers have a high degree of compatibility with each other and thus adhere strongly to one another (making the film laminate highly resistant to delamination). Furthermore, because of their differing melting points, the higher melting second film layer may be considered to function as a carrier for the lower melting first film layer, which can be softened by heating and adhered to a substrate surface without losing the mechanical integrity of the laminate.

DETAILED DESCRIPTION OF THE INVENTION

Polyaryletherketones

The film laminates of the present invention utilize, in different layers, polyaryletherketones having different melting characteristics, as will subsequently be described in more detail.

Polyaryletherketones (sometimes referred to by the acronym "PAEK") are a class of polymers often classified as engineering thermoplastics due to their high temperature stability and high mechanical strength, whose molecular backbones contain both ketone-containing groups (—R—C(=O)—R—) and ether-containing groups (—R—O—R) wherein the linking groups R between the functional groups are aryl groups (e.g., phenylene rings and/or diphenylene groups). The ratio of ether-containing groups to ketone-containing groups as well as the sequence of these different groups in the polymer backbone affect the glass transition temperature and melting point of the polyaryletherketone, as well as its heat resistance and processing temperature. For example, generally speaking the higher the proportion of ketone-containing groups relative to ether-containing groups, the more rigid the polymer chain becomes, leading to a higher Tg and higher melting point. Plastics which fall within the polyaryletherketone family include, but are not limited to, polyetherketones (PEKs), polyetheretherketones (PEEKs), polyetherketoneketones (PEKKs), polyetheretherketoneketones (PEEKKs), polyetherketoneetherketoneketones (PEKEKKs), polyetherketoneketoneketone (PEKKKs), polyetheretheretherketones (PEEEKs), polyetherdiphenyletherketone (PEDEKs) and any combination of these in a copolymer (for example, a polyetherdiphenyletherketone-polyetheretherketone copolymer, such as a copolymer of the type described in U.S. Pat. No. 4,717,761). Although any of such polyaryletherketones may be employed in the film laminates of the present invention (provided they satisfy the melting point characteristics described herein), in certain advantageous embodiments at least one of the polyaryletherketones present in the first or second film layers of the laminate is a polyetherketoneketone (PEKK). In further advantageous embodiments, both the polyaryletherketone of the first film layer and the polyaryletherketone of the second film layer are polyetherketoneketones (PEKKs), wherein the polyetherketoneketones of each film layer are different from each other and are selected to have an appropriate or desired melting point in accordance with the present invention.

In other embodiments, the first polyaryletherketone of the first film layer and the second polyaryletherketone of the second film layer are different types of polyaryletherketones. Illustrative examples of such embodiments include:

| Embodiment | First Polyaryletherketone | Second Polyaryletherketone |
|---|---|---|
| A | Polyetherketoneketone (PEKK) | Polyetherketoneketone (PEKK) |
| B | Polyetherketoneketone (PEKK) | Polyetheretherketone (PEEK) |
| C | Polyetherdiphenyletherketone - Polyetheretherketone copolymer (PEDEK-PEEK) | Polyetheretherketone (PEEK) |
| D | Polyetherdiphenyletherketone - Polyetheretherketone copolymer (PEDEK-PEEK) | Polyetherketoneketone (PEKK) |

Polyetherketoneketones suitable for use in the present invention may comprise, consist essentially of or consist of repeating units represented by the following Formulas I and II:

$$-A-C(=O)-X-C(=O)- \qquad \text{I}$$

$$-A-C(=O)-Y-C(=O)- \qquad \text{II}$$

where A is a p,p'-Ph-O-Ph- group, Ph is a phenylene radical, X is p-phenylene, and Y is m-phenylene. The Formula I:Formula II (T:I) isomer ratio in the polyetherketoneketone may be varied so as to provide an amorphous (non-crystalline) polymer or a semi-crystalline polymer or so as to increase or decrease the melting point of the polymer. An amorphous polymer, for purposes of this invention, means a polymer that exhibits less than 5% crystalline structure as determined by X-ray diffraction. A semi-crystalline polymer, for purposes of this invention, means a polymer that exhibits at least 5% crystalline structure as determined by X-ray diffraction. For instance, X-ray diffraction data may be collected with copper K-alpha radiation at 0.5 deg/min for two-theta angles ranging from 5.0° to 60.0°. The step size used for data collection should be 0.05° or lower. The diffractometer optics should be set as to reduce air scattering in the low angle region around 5.0° two-theta. Crystallinity data may be calculated by peak fitting X-ray diffraction patterns and taking into account crystallographic data for the polymer of interest. A linear baseline may be applied to the data between 5° and 60°.

Polyetherketoneketones are well-known in the art and can be prepared using any suitable polymerization technique, including the methods described in the following patents, each of which is incorporated herein by reference in its entirety for all purposes: U.S. Pat. Nos. 3,065,205; 3,441,538; 3,442,857; 3,516,966; 4,704,448; 4,816,556; and 6,177,518.

In particular, the Formula I:Formula II ratio (sometimes referred to in the art as the T/I ratio) can be adjusted as desired (to control melting point and the degree of crystallinity of the resulting PEKK, for example), by varying the relative amounts of the different monomers used to prepare the polyetherketoneketone. For example, a polyetherketoneketone may be synthesized by reacting a mixture of terephthaloyl chloride and isophthaloyl chloride with diphenyl ether.

Increasing the amount of terephthaloyl chloride relative to the amount of isophthaloyl chloride will increase the Formula I:Formula II (T/I) ratio. Generally speaking, a polyetherketoneketone having a relatively high Formula I:Formula II ratio will be more crystalline and/or have a higher melting point than a polyetherketoneketone having a lower Formula I:Formula II ratio.

According to certain exemplary embodiments, the first polyaryletherketone may be a polyetherketoneketone comprising, consisting essentially of or consisting of repeating units represented by Formula I and Formula II:

-A-C(=O)—X—C(=O)—  I

-A-C(=O)—Y—C(=O)—  II where A is a p,p'-Ph-O-Ph- group, Ph is a phenylene radical, X is p-phenylene and Y is m-phenylene and the repeating units of Formula I and Formula II are present in the first polyaryletherketone in an isomer ratio of Formula I:Formula II of from 50:50 to 75:25, from 55:45 to 72:28, or from 55:45 to 65:35.

According to other exemplary embodiments, the second polyaryletherketone is a polyetherketoneketone comprising, consisting essentially of or consisting of repeating units represented by Formula III and Formula IV:

-A'-C(=O)—X'—C(=O)—  III

-A'-C(=O)—Y'—C(=O)—  IV where A' is a p,p'-Ph-O-Ph- group, Ph is a phenylene radical, X' is p-phenylene and Y' is m-phenylene and the repeating units of Formula III and Formula IV are present in the second polyaryletherketone in an isomer ratio of Formula III:Formula IV of from 100:0 to 65:35, 100:0 to 67:33 or from 85:15 to 75:25.

In preferred embodiments of the invention, the film laminate comprises, consists of or consists essentially of:

a) a first film layer comprised of a first polyetherketoneketone having a melting point of 290° C. to 350° C.; and b) a second film layer comprised of a second polyetherketoneketone having a melting point of 345° C. to 400° C. which is at least 25° C. higher than the melting point of the first polyetherketoneketone;

wherein the first film layer and the second film layer are directly adhered to each other;

wherein the first polyetherketoneketone comprises repeating units represented by Formula I and Formula II:

-A-C(=O)—X—C(=O)—  I

-A-C(=O)—Y—C(=O)—  II where A is a p,p'-Ph-O-Ph- group, Ph is a phenylene radical, X is p-phenylene and Y is m-phenylene and the repeating units of Formula I and Formula II are present in the first polyetherketoneketone in an isomer ratio of Formula I:Formula II of from 55:45 to 72:28; and wherein the second polyetherketoneketone comprises repeating units represented by Formula III and Formula IV:

-A'-C(=O)—X'—C(=O)—  III

-A'-C(=O)—Y'—C(=O)—  IV where A' is a p,p'-Ph-O-Ph- group, Ph is a phenylene radical, X' is p-phenylene and Y' is m-phenylene and the repeating units of Formula III and Formula IV are present in the second polyetherketoneketone in an isomer ratio of Formula III:Formula IV of from 65:35 to 100:0.

Suitable polyetherketoneketones are available from commercial sources, such as, for example, the polyetherketoneketones sold under the brand name KEPSTAN by Arkema, Inc. For example, Kepstan® 6002 and 6003, which have melting points of about 300° C. to 305° C., could be used as the first polyaryletherketone, and Kepstan® 8001 and 8002, which respectively have melting points of about 357° C. and 360° C., could be used as the second polyaryletherketone.

The "melting point" of a polyaryletherketone, in the context of the present invention, refers to the melting point of the polyaryletherketone as measured by differential scanning calorimetry (DSC) during the second heat, using the following temperature cycle:

heat from 20° C. to 400° C. at 10° C./min;
cool from 400° C. to 20° C. at 1° C./min;
heat from 20° C. to 400° C. at 10° C./min.

The first polyaryletherketone which comprises the first film layer of the film laminate has a melting point lower than that of the second polyaryletherketone. In various embodiments, the melting point of the first polyaryletherketone is, for example not more than 350° C., 345° C., 340° C., 335° C., 330° C., 325° C., 320° C., 315° C., 310° C., 305° C., or 300° C. In certain embodiments, the first polyaryletherketone has a melting point of at least 260° C., 270° C., 275° C., 280° C., 285° C., 290° C., 295° C. or 300° C. The first polyaryletherketone may have, for example, a melting point of from 260° C. to 350° C. or from 290° C. to 320° C.

The second polyaryletherketone which comprises the second film layer of the film laminate is selected to have a melting point at least 25° C. higher than the melting point of the first polyaryletherketone. In other embodiments of the invention, the melting point of the second polyaryletherketone has a melting point which is at least 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C. or 55° C. higher than the melting point of the first polyaryletherketone. According to various embodiments of the invention, the second polyaryletherketone may have a melting point of at least 300° C., 305° C., 310° C., 315° C., 320° C., 325° C., 330° C., 335° C., 340° C., 345° C., 350° C., 355° C., 360° C., 365° C., 370° C., 375° C., 380° C., 385° C., 390° C., 395° C., 400° C., 405° C., 410° C., 415° C. or 420° C. The second polyaryletherketone, in other embodiments of the invention, may have a melting point not greater than 430° C., 425° C., 420° C., 415° C., 410° C., 405° C., 400° C., 395° C., 390° C., 385° C., 380° C., 375° C. or 370° C., provided such melting point is at least 25° C. higher than the melting point of the first polyaryletherketone. For example, the melting point of the second polyaryletherketone may be from 350° C. to 420° C. or from 345° C. to 400° C.

In further embodiments of the invention, one or both of the first polyaryletherketone and the second polyaryletherketone has a glass transition temperature (Tg), as measured by differential scanning calorimetry, of, in increasing order of preference, at least 120° C., at least 130° C., at least 140° C., at least 150° C. or at least 160° C. The glass transition temperature is measured by Differential Scanning Calorimetry during the second heating at 20° C./min, according to ISO11357.

By utilizing a polyaryletherketone in the first film layer which has a melting temperature significantly less than that of the polyaryletherketone employed in the second film layer, the resulting film laminate is able to be readily adhered to the surface of a substrate by heating the first film layer to a temperature effective to soften or even melt the first film layer and contacting the heated first film layer with the substrate surface (pressure may be applied to ensure intimate contact between the first film layer and the substrate surface). Upon cooling, the first film layer solidifies and remains adhered to the substrate surface. The first film layer thus may be considered to function as a hot melt adhesive, joining together the substrate and the film laminate. At the same time, the heating temperature is selected to be sufficiently low so as to avoid softening the second film layer to the point that it substantially loses its structural and mechanical integrity (i.e., a heating temperature below the melting point of the second polyaryletherketone which comprises the second film layer, e.g., a heating temperature that is at least 5° C., 10° C., 15° C., 20° C., or 25° C. below the melting point of the second polyaryletherketone). The second film layer, by virtue of the higher melting point of the second polyaryletherketone as compared to the melting point of the first polyaryletherketone in the first film layer, thus may be considered to function as a carrier film for the first film layer during such a process of adhering the film laminate to a substrate surface.

According to certain embodiments of the invention, each of the polyaryletherketones used in the film laminates may independently have a molecular weight such that its inherent viscosity in 96% sulfuric acid as measured by the ISO 307 test method is between about 0.5 and 1.5 dL/g, preferably between about 0.6 and 1.2 dL/g, more preferably between about 0.7 and 1.1 dL/g.

Other Components of First and Second Film Layers

The first and second film layers of the film laminate may additionally be comprised of components other than the above-described polyaryletherketones, such as stabilizers, pigments, processing aids, fillers and the like. In certain embodiments of the invention, however, the first film layer consists essentially of or consists of the first polyaryletherketone. In still other embodiments, the second film layer consists essentially of or consists of the second polyaryletherketone. According to certain embodiments of the invention, one or both of the first film layer and the second film layer are formulated and processed to provide a clear (transparent) layer. In further embodiments of the invention, one or both of the first film layer and the second film layer are formulated and processed to provide a translucent or opaque layer.

Arrangement of the Film Layers in the Film Laminate

In the film laminates of the present invention, the first film layer and the second film layer are directly adhered to each other. That is, no adhesive or tie layer is interposed between the first and second film layers. As both the first and second film layers are comprised of polyaryletherketone, the layers are highly compatible with each other and a strong bond which is resistant to delamination may be formed between the film layers without the need for an adhesive or tie layer. Further, by omitting any adhesive or tie layer between the first and second film layers, film laminates can be provided which are free of any material which might otherwise tend to detract from the desirable combination of properties afforded by the polyaryletherketones (e.g., high continuous use temperature, high heat resistance, high weatherability, high resistance to wear and abrasion, high resistance to moisture (non-hygroscopic), and high resistance to chemicals such as solvents and corrosive substances).

Typically, each of the film layers in the film laminate is relatively thin, with the resulting film laminate also having a low thickness. For example, the first film layer may have a thickness of from 5 to 100 microns and the second film layer may have a thickness of from 5 to 200 microns. The thicknesses of the first and second film layers may be the same as or different from each other. In one embodiment, however, the first film layer is thinner than the second film layer. For instance, the first film layer may be 20 to 30 microns thick, with the second film layer being 40 to 60 microns thick. The overall thickness of the film laminate (first film layer+second film layer) may, in various aspects of the invention, be from 10 to 300 microns.

The thickness of a film layer (prior to be incorporated into a film laminate) and the thickness of a film laminate may be measured in accordance with Method A of ASTM D6988-13, entitled "Standard Guide for Determination of Thickness of Plastic Film Test Specimens". This method utilizes a manually operated thickness gauge, having a presser foot and spindle that is manually lifted and lowered. If ASTM D6988-13 has been superseded, then the thickness may be measured in accordance with superseding ASTM D6988-XX and the method in the superseding ASTM D6988-XX which utilizes a manually operated thickness gauge, having a presser foot and spindle that is manually lifted and lowered. As used herein, the term "thickness" when referring to the thickness of a particular film layer present as part of a film laminate means the following:

a) when the film laminate is made by a co-extrusion method, the thickness of an individual layer is determined by measuring the overall thickness of the film laminate in accordance with Method A of ASTM D6988-13 and multiplying it by a correction factor equal to the ratio of the feed rate of the resin composition used to prepare that individual layer to the sum of the feed rates of the resin compositions used to prepare both the first and second film layer;

b) when the film laminate is made by laminating separate preformed film layers (using, for example, a roll to roll or a press lamination), the film layer thickness refers to the thickness of the film layer before being laminated as measured in accordance with Method A of ASTM D6988-13;

c) when the film laminate is made by an extrusion coating method, wherein a resin composition is extrusion coated onto a base film, the thickness of the base film (forming one of the two film layers in the film laminate) refers to the thickness of the base film layer before being extrusion coated as measured in accordance with Method A of ASTM D6988-13 and the thickness of the extrusion-coated layer (forming the other film layer in the film laminate) refers to the difference between the total thickness of the film laminate (as measured in accordance with Method A of ASTM D6988-13) and the thickness of the base film.

Preparation of the Film Laminate

Film laminates in accordance with the present invention may be fabricated by appropriate adaptation of any of the techniques known in the art for creating multilayer films of thermoplastics. For example, both co-extrusion and co-lamination methods may be used.

In one embodiment, the film laminates of the invention may be manufactured by adapting known co-extrusion processes, wherein the first polyaryletherketone and the second polyaryletherketone (or formulated resin compositions containing such polymers) are co-extruded to respectively form the first film layer and the second film layer. For example, the apparatus used for making such film laminates can be any type of conventional or standard extruder, die or stream distributor generally employed for the co-extrusion of thermoplastic polymers. The thickness of each of the polymeric layers will depend on the regulation of the flow rate of each of the extruders. Generally, the die and extruder temperatures should be selected based on the characteristics and properties of the polyaryletherketones to be used in the first film layer and the second film layer so that the materials are rendered capable of being co-extruded.

Suitable co-lamination methods include processes wherein a preformed film comprised of the first polyaryletherketone and a preformed film comprised of the second polyaryletherketone are laminated to each other under heat and pressure to form a film laminate in accordance with the present invention. Such co-lamination conditions preferably are selected such that a strong bond between the first and second film layers is achieved.

Yet another suitable method involves extruding the first film layer comprising the first polyaryletherketone onto a preformed film comprised of the second polyaryletherketone (which then serves as the second film layer).

Still further embodiments for forming film laminates in accordance with the invention involve co-extrusion and co-lamination methods in which a film laminate is formed directly on a surface of a substrate. For example, a substrate, a first preformed film comprised of the first polyaryletherketone (which will form the first film layer of the film laminate) and a second preformed film comprised of the second polyaryletherketone (which will form the second film layer of the film laminate) may be brought together under heat and pressure to form a film laminate on a surface of the substrate.

In each of the above-mentioned processes, cooling and/or further processing of the film laminate which is formed may be carried out under conditions effective to control certain characteristics of the film laminate, such as the degree of crystallinity of the first and/or second polyaryletherketone in the layers of the film laminate. As an example, it may be of particular interest to have the first polyaryletherketone in an amorphous state, in order to promote good adhesion to the substrate, and the second polyaryletherketone in a semi-crystalline state so that it confers high chemical resistance to the final object.

Uses for the Film Laminate

The film laminates of the present invention may be employed in any application in which it is desired to protect and/or insulate a substrate. By applying a film laminate to a surface of a substrate, wherein the first film layer functions to adhere the film laminate to the substrate surface, the substrate surface may be protected from the effects of abrasion, wear, heat, weathering, moisture, caustic, acidic or corrosive substances, chemicals (including solvents) and the like by the outer surface of the second film layer comprised of the second polyaryletherketone (which is highly resistant to such conditions and agents, as is the first polyaryletherketone). Thus, the present invention provides, in one embodiment, an article comprised of a substrate having a surface and a film laminate in accordance with the invention, wherein the first film layer is adhered to the surface of the substrate (in one aspect, adhered directly to the substrate surface, without any adhesive, tie or primer layer). The nature of the substrate surface is not particularly critical and may be, for example, polymeric, metallic, ceramic (including glass), cellulosic or a composite of different materials.

According to one embodiment of the invention, the substrate has at least one surface containing at least one metallic element which is part of a conductor circuit. The metallic element(s) may be laminated, etched, printed or deposited on the substrate surface, for example. Articles prepared from such substrates and laminate films in accordance with the present invention include, for instance, laminated electronic circuits, flexible heaters and radio frequency identification (RFID) tags.

A laminate film in accordance with the invention may be affixed to a single surface of a substrate or, alternatively, to more than one surface of a substrate. The laminate film may fully encase or encapsulate the substrate. The substrate (or a plurality of substrates) may be encased or encapsulated by a combination of a laminate film in accordance with the present invention and at least one other type of film (in particular, another type of thermoplastic film). For example, a relatively flat, thin substrate may be sandwiched between a first portion of a laminate film in accordance with the present invention and a second portion of a laminate film in accordance with the invention, wherein the exposed surface of the first film layer of the first portion is affixed to one side of the substrate and the exposed surface of the first film layer of the second portion is affixed to the other side of the substrate. One way of making such a sandwich structure would be to place a substrate between a pair of laminate films in accordance with the invention, which are arranged so that the first film layers face each other, so that the substrate intervenes between the film laminates to form a composite and the formed composition is then pressed under heating (whereby the heating is effective to cause the first film layers to fuse together (where they are in contact with each other) and/or to cause one or both of the first film layers to fuse to a surface of the substrate (where a first film layer is in contact with a substrate surface). Preferably, both sides of the substrate are completely covered by the film laminate, with the second film layers of the first and second portions facing outwards away from the substrate and forming a protective barrier on both sides of the substrate. In one embodiment, the peripheries of the first and second portions of the film laminate correspond to the periphery of the substrate. In another embodiment, however, the peripheries of both the first and second portions of the film laminate extend out beyond the periphery of the substrate and such extensions are brought into contact with each other and heat-sealed around the periphery of the resulting article so as to protect the substrate edges as well. A similar effect may also be achieved, for example, by folding a portion of a film laminate in accordance with the present invention over a substrate such that the film laminate is on both sides of the substrate and then heat-sealing the first film layer to itself around the periphery of the substrate and possibly also to the substrate surface(s) as well. A plurality of substrates may be similarly encapsulated by a single pair of film laminates in accordance with the invention, wherein the first film layer is adhered to itself in the regions between the substrates.

A process for utilizing film laminates in accordance with the present invention to produce an encased substrate may be described as follows:

a). positioning at least one substrate (e.g., one or more electronic elements such as computer chips or heating elements) directly between a first film laminate in accordance with the present invention and a second film laminate in accordance with the present invention, wherein both the first film laminate and the second film laminate are positioned so that the first film layers comprised of a first polyaryletherketone, in each of the first film laminate and the second film laminate, face the substrate(s) and each other and the second film layers comprised of the second polyaryletherketone (which has a higher melting point than the first polyaryletherketone), in each of the first film laminate and the second film laminate, face outwards away from the substrate(s) to provide an assembly;

b). positioning the assembly in a laminator apparatus;

c). subjecting the assembly to heat and pressure in the laminator apparatus under conditions effective to cause the first film layers to adhere to the substrate and, optionally, each other, whereby the first and second film laminates encapsulate the substrate(s).

Figure 1:
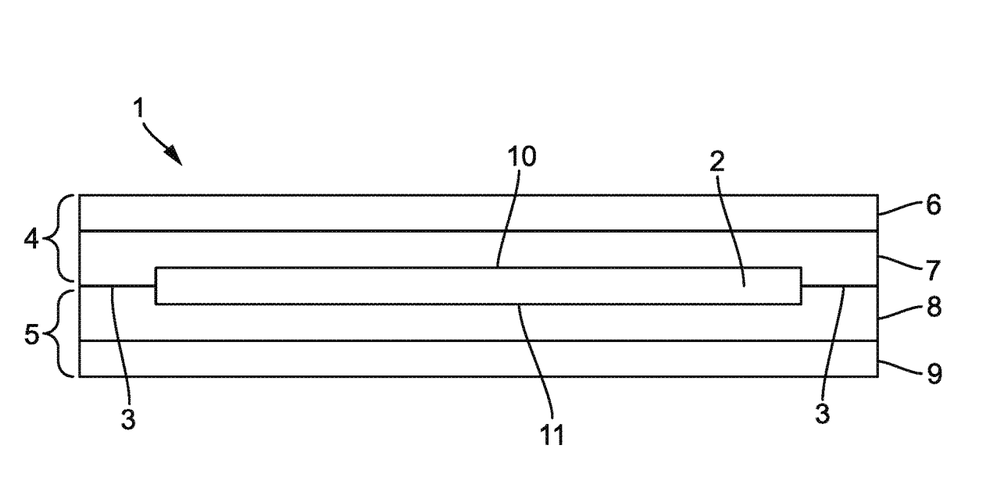
FIG. 1 shows a cross-sectional view of an article wherein a substrate is encapsulated in a sandwich structure by two film laminates in accordance with the present invention.

By way of example, FIG. 1 (not drawn to scale) shows a representative cross-sectional view of an article 1 wherein a substrate 2 (which may be, for example, an electronic component or a heating element) is encapsulated in a sandwich structure. Substrate 2 is encapsulated by a first film laminate 4 and a second film laminate 5. First film laminate 4 is comprised of a first film layer 7 and a second film layer 6, with surface 10 of first film layer 7 in intimate contact with (e.g., bonded to) a first surface of substrate 2. First film layer 7 is comprised of a first polyaryletherketone having a melting point, while second film layer 6 is comprised of a second polyaryletherketone having a melting point at least 25° C. higher than the melting point of the first polyaryletherketone. First film layer 7 and second film layer 6 are directly adhered to each other. Second film laminate 5 is comprised of first film layer 8 and second film layer 9, with surface 11 of first film layer 8 in intimate contact with (e.g., bonded to) a second surface of substrate 2. First film layer 8 is comprised of a first polyaryletherketone having a melting point, while second film layer 8 is comprised of a second polyaryletherketone having a melting point at least 25° C. higher than the melting point of the first polyaryletherketone. First film layer 8 and second film layer 9 are directly adhered to each other. First film laminate 4 and second film laminate 5 may be identical to, or different from, each other, with respect to, for example, their thickness, the thicknesses of the first and second film layers, the compositions of the first and second film layers, etc. At the periphery of substrate 2, portions of first film layer 7 and first film layer 8 are laminated to each other in heat sealed region 3.

The laminate films of the present invention are particularly useful in the manufacture of articles such as laminated electronic circuits, flexible heaters, insulated wire and cable, radio frequency identification tags and labeled articles. For example, it is contemplated that the laminate films may be used in any of the applications in which conventional polyimide/fluorinated ethylene propylene laminates are currently utilized.

For example, the laminate film of the invention may be applied in the form of a tape to a wire, wire bundle or cable in a manner such that the first film layer is adhered to the surface of the wire, wire bundle or cable, for instance by contacting the first film layer while in a heated, softened state with such surface such that the first film layer becomes adhered to the surface upon cooling. However, in other embodiments, the first film layer need not be adhered to the wire, wire bundle or cable surface. If the tape is wrapped around the wire, wire bundle or cable in an overlapping manner (such that the edges of the wrapped tape overlap with each other or such that multiple layers of wrapped tape are formed, for example as a result of the tape of the laminate film being applied to form a spiral wrap or wrapped around the wire, wire bundle or cable such that the adjacent side ends of the tape are in an overlapping relationship and define a longitudinally extending seam), the first film layer which is brought into contact with the outer surface of the second film layer in overlapping regions may be heat-sealed to the second film layer so as to completely seal off the wrapped wire, wire bundle or cable (thereby preventing the ingress of agents through the overlapping regions and providing more complete protection and insulation of the wire, wire bundle or cable). The film laminates of the present invention thus may be used as insulative or protective wraps.

The thickness of the film laminate, the degree of overlap between layers of the film laminate and the number of layers of film laminate in such an insulative or protective wrap may all be varied to provide a desired insulation or protective product with any given wall thickness. The film laminate may be wrapped around a wire, wire bundle or cable and then heat-sealed to yield a continuous coating around the wire, wire bundle or cable. The film laminate may be directly manufactured in the desired configuration for such wrapping purposes, or may be manufactured in the form of a wide sheet that is then slit into narrow widths to provide the tapes used for wrapping. Heat-sealing of the film laminate is accomplished by treating the laminate film-wrapped wire, wire bundle or cable at a temperature and for a time sufficient to fuse the first film layer to the second film layer where layers of the film laminate overlap with each other. Typically, such a temperature will be slightly below, at or above the melting point of the first polyaryletherketone but below the melting point of the second polyaryletherketone. In another embodiment, such a temperature is above the glass transition temperature of the first polyaryletherketone but below the melting point of the second polyaryletherketone.

A flexible heater, in particular a flexible heating sheet, may comprise an electric heating element, such as a metal wire or foil (which may be in the form of a straight line or a circuit pattern, for example), and at least a first portion of a film laminate in accordance with the present invention. The first film layer of the film laminate may be affixed to the electric heating element, for example by way of heat fusing. In other embodiments, however, the film laminate may be deployed in the form of a sandwich structure, wherein the electric heating element is sealed between a first portion and a second portion of a film laminate in accordance with the present invention (wherein the first film layer in the first portion and the first film layer in the second portion are facing towards each other). For example, a flexible heating sheet may be provided which comprises an electric heating circuit element and two sheets of film laminate in accordance with the invention, wherein the two sheets of film laminate are arranged opposite to each other with the first film layers of the two sheets fused to each other such that the electric heating circuit element is sealed between the two sheets. Thus, the flexible heating sheet may be comprised of a pair of film laminates in accordance with the present invention with an electric heating element interposed between the laminate films, with the first film layers of the film laminates facing each other.

One way of making such a flexible heating sheet would be to place a previously formed heating element in the form of a circuit between a pair of film laminates in accordance with the invention such that the heating element intervenes between the pair of film laminates to form an assembly and to then press the assembly under heating using conditions whereby fusion of the first film layers in the film laminates to each other and/or the heating element is achieved, thereby forming the flexible heating sheet (wherein the heating element is effectively enclosed and protected by the film laminates). Another approach to fabricating such a flexible heating sheet would be to place a conductive metal foil on the first film layer of a film laminate in accordance with the invention, etch the conductive metal foil placed on the first film layer to form a circuit pattern, place a second film laminate in accordance with the invention on the etched conductive metal foil such that the first film layer of the second film laminate face the etched conductive metal foil to form an assembly, and press the assembly under heating using conditions whereby fusion of the first film layers in the film laminates to each other and/or the etched conductive metal foil (forming the circuit pattern) is achieved, thereby forming the flexible heating sheet (wherein the heating element is effectively enclosed and protected by the film laminates).

The electric heating circuit element may have an electric source-connecting terminal at each end thereof, with each electric source-connecting terminal remaining exposed from the fused sheets of film laminate. In other embodiments, the electric heating element may be deposed on a substrate (in particular, an insulative substrate) other than a film laminate in accordance with the present invention, with a portion of the film laminate covering the electric heating element. The substrate may be, for example, another type of polymeric film.

The film laminates of the present invention are also useful in the manufacture of durable plastic cards and the like containing embedded electronic elements (e.g., computer chips), such as "smart cards" (including both contact smart cards and contactless smart cards); radio frequency identification cards; credit, ATM and debit cards; identification cards, pass cards (access badges; security tokens); public transport access badges or fare cards; and the like. Thus, one aspect of the invention is directed to a plastic card having at least one electronic element embedded therein, wherein one or more laminate films in accordance with the present invention comprises a plastic core within which the electronic element(s) is or are embedded. At least one of the upper or lower surfaces of the core may have a coating printed or otherwise applied thereon, possibly with an overlaminate film being provided over the coated surface of the plastic core. Such a plastic card may be obtained, for example, by positioning at least one electronic element between a first film laminate in accordance with the invention and a second film laminate in accordance with the invention (wherein the first and second film laminates may be the same as, or different from, each other) to form an assembly, the first and second film laminates being arranged so that the first film layers face each other in the assembly, and then pressing and heating the assembly under conditions effective to cause fusion of the first film layers to each other and/or the embedded electronic element(s). A hot lamination procedure thus may be used. In one embodiment, the assembly is heated before being pressed, but in other embodiments heating and pressing are carried out simultaneously. Electronic elements capable of being embedded or encapsulated using film laminates in accordance with the present invention may take a wide variety of forms and provide a wide variety of functions. Suitable electronic elements for a radio frequency identification card, for example, include microchips, wire antennas, circuit board antennas, wire coil antennas, read/write micro-chips and the like.

As previously mentioned, the film laminates of the present invention may be employed in the manufacture of labeled articles. Such labeled articles may be prepared using high temperature inks and techniques such as laser etching. Suitable inking processes would include inkjet printing (e.g., Videojet-type printing), screen printing, dye sublimation printing and laser etch printing (laser marking). The film laminates of the present invention are especially well suited for use in producing labels that are expected to be exposed to high temperature production environments such as automotive paint curing, polymer powder coating of metals and steam sterilization.

Touch key pads (keyboards) that are or are expected to be exposed to relatively harsh conditions, such as high moisture environments, exposure to harsh chemicals and/or high temperatures, as may be encountered during sterilization or cleaning of such touch key pads (for example, in a medical use environment), may be advantageously fabricated using film laminates in accordance with the present invention. The film laminates of the present invention are also useful for the production of radio frequency identification (RFID) tags (cards) and other such products having computer chips and the like embedded therein. For example, one or more computer chips may be encapsulated by lamination between two portions of a film laminate in accordance with the invention, whereby the film laminate protects the computer chip(s) such that the resulting RFID tag is highly resistant to steam sterilization conditions, radiation, chemicals (e.g., solvents), wear and other harsh conditions.

Various illustrative aspects of the present invention may be summarized as follows:

Aspect 1: A film laminate comprised, consisting or consisting essentially of:
a) a first film layer comprised of a first polyaryletherketone having a melting point; and
b) a second film layer comprised of a second polyaryletherketone having a melting point at least 25° C. higher than the melting point of the first polyaryletherketone; wherein the first film layer and the second film layer are directly adhered to each other.

Aspect 2: The film laminate of Aspect 1, wherein the melting point of the first polyaryletherketone is not more than 350° C.

Aspect 3: The film laminate of Aspect 1 or 2, wherein the melting point of the second polyaryletherketone is at least 40° C. higher than the melting point of the first polyaryletherketone.

Aspect 4: The film laminate of any of Aspects 1 to 3, wherein the melting point of the second polyaryletherketone is at least 50° C. higher than the melting point of the first polyaryletherketone.

Aspect 5: The film laminate of any of Aspects 1 to 4, wherein the melting point of the second polyaryletherketone is at least 350° C.

Aspect 6: The film laminate of any of Aspects 1 to 5, wherein at least one of the first polyaryletherketone or the second polyaryletherketone (as present in the film laminate) is amorphous.

Aspect 7: The film laminate of any of Aspects 1 to 6, wherein the second polyaryletherketone (as present in the film laminate) is semi-crystalline.

Aspect 8: The film laminate of any of Aspects 1 to 7, wherein at least one of the first polyaryletherketone and the second polyaryletherketone is a polyetherketoneketone.

Aspect 9: The film laminate of any of Aspects 1 to 8, wherein the first polyaryletherketone is a polyetherketoneketone comprising repeating units represented by Formula I and Formula II:

$$\text{-A-C(=O)—X—C(=O)—} \qquad \qquad \text{I}$$

$$\text{-A-C(=O)—Y—C(=O)—} \qquad \qquad \text{II}$$

where A is a p,p'-Ph-O-Ph- group, Ph is a phenylene radical, X is p-phenylene and Y is m-phenylene and the repeating units of Formula I and Formula II are present in the first polyaryletherketone in an isomer ratio of Formula I:Formula II of from 50:50 to 72:28.

Aspect 10: The film laminate of Aspect 9, wherein the isomer ratio of Formula I:Formula II in the first polyaryletherketone is from 55:45 to 65:35.

Aspect 11: The film laminate of any of Aspects 1 to 10, wherein the second polyaryletherketone is a polyetherketoneketone comprising repeating units represented by Formula III and Formula IV:

III

IV where A' is a p,p'-Ph-O-Ph- group, Ph is a phenylene radical, X' is p-phenylene and Y' is m-phenylene and the repeating units of Formula III and Formula IV are present in the second polyaryletherketone in an isomer ratio of Formula III:Formula IV of from 100:0 to 67:33.

Aspect 12: The film laminate of Aspect 11, wherein the isomer ratio of Formula III:Formula IV in the second polyaryletherketone is from 85:15 to 75:25.

Aspect 13: The film laminate of any of Aspects 1 to 7, wherein the second polyaryletherketone is a polyetheretherketone.

Aspect 14: The film laminate of any of Aspects 1 to 7, wherein the first polyaryletherketone is a polyetheretherketone or a polyetherdiphenyletherketone-polyetheretherketone copolymer.

Aspect 15: The film laminate of any of Aspects 1 to 14, wherein the first film layer has a thickness of from 5 to 100 microns.

Aspect 16: The film laminate of any of Aspects 1 to 15, wherein the second film layer has a thickness of from 5 to 200 microns.

Aspect 17: The film laminate of any of Aspects 1 to 16, wherein the film laminate has a thickness of from 10 to 300 microns.

Aspect 18: The film laminate of any of Aspects 1 to 17, wherein at least one of the first polyaryletherketone or the second polyaryletherketone has a glass transition temperature of at least 120° C.

Aspect 19: The film laminate of Aspect 1, wherein:
a) the first polyaryletherketone is a polyetherketoneketone which is amorphous, has a melting point of not more than 315° C., and comprises repeating units represented by Formula I and Formula II:

I

II where A is a p,p'-Ph-O-Ph- group, Ph is a phenylene radical, X is p-phenylene and Y is m-phenylene and the repeating units of Formula I and Formula II are present in the first polyaryletherketone in an isomer ratio of Formula I:Formula II of from 55:45 to 65:35;
b) the second polyaryletherketone is a polyetherketoneketone which is semi-crystalline, has a melting point of at least 350° C., and comprises repeating units represented by Formula III and Formula IV:

III

IV where A' is a p,p'-Ph-O-Ph- group, Ph is a phenylene radical, X' is p-phenylene and Y' is m-phenylene and the repeating units of Formula III and Formula IV are present in the second polyaryletherketone in an isomer ratio of Formula III:Formula IV of from 85:15 to 75:20; and
c) the film laminate has a thickness of from 40 to 110 microns.

Aspect 20: An article comprised of a substrate having a surface and a film laminate in accordance with any of Aspects 1 to 19, wherein the first film layer is adhered to the surface of the substrate.

Aspect 21: The article of Aspect 20, wherein the article is selected from the group consisting of laminated electronic circuits, flexible heaters, insulated wire and cable, radio frequency identification tags and labeled articles.

Aspect 22: The article of Aspect 20 or 21, wherein the substrate is selected from the group consisting of polymeric substrates, metallic substrates, ceramic substrates and composites thereof.

Aspect 23: The article of any of Aspects 20 to 22, wherein the surface of the substrate is comprised of at least one metallic element forming part of a conductor circuit.

Aspect 24: The article of any of Aspects 20 to 23, wherein the substrate has a first surface and a second surface and a first portion of the film laminate is adhered to the first surface of the substrate and a second portion of the film laminate is adhered to the second surface of the substrate, the first portion and the second portion of the film laminate cooperating so as to encapsulate the substrate.

Aspect 25: A method of making an article in accordance with any of Aspects 20 to 24, comprising heating the first layer of the film laminate to a temperature which is at least as high as the melting point of the first polyaryletherketone but not higher than 20° C. below the melting point of the second polyaryletherketone and contacting the first layer while heated with the surface of the substrate.

Aspect 26: An article comprised of a substrate having a surface and a film laminate in accordance with Aspect 19, wherein the first film layer is adhered to the surface of the substrate and the article is selected from the group consisting of laminated electronic circuits, flexible heaters, insulated wire and cable, radio frequency identification tags and labeled articles.

Aspect 27: A method of making an article in accordance with Aspect 26, comprising heating the first layer of the film laminate to a temperature which is at least as high as the melting point of the first polyaryletherketone but not higher than 40° C. below the melting point of the second polyaryletherketone and contacting the first layer while heated with the surface of the substrate.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the film laminates, articles prepared from such film laminates or processes for making or using the film laminates. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Example 1

A first film layer consisting of an amorphous film of Kepstan® 6002 PEKK (Arkema) with a thickness of 50 microns, a melting point of 295° C. and a glass transition temperature of 160° C. was placed onto a second film layer consisting of an amorphous film of Kepstan® 8002 PEKK (Arkema) with a thickness of 50 microns, a melting point of 355° C. and a glass transition temperature of 163° C. The resulting assembly was placed into a hot roll laminator with a moveable heated steel roll and a rubberized drive wheel. The top roll was heated to 220° C., and the feed rate was fixed at 50 cm/min. Pneumatic cylinders were used to clamp the top roll to the bottom with modest force. The laminate obtained had a thickness of 100 microns, and a good cohesive bonding between the two layers was obtained. The laminate exhibited an amorphous state on the first film layer side, and the second film layer was also amorphous. The film laminate obtained can be further heated under conditions such that the first film layer remains amorphous and the second film layer becomes semi-crystalline.

Example 2 (Prophetic)

A first film layer consisting of an amorphous film of Kepstan® 6002 PEKK (Arkema) with a thickness of 50 microns, a melting point of 295° C. and a glass transition temperature of 160° C. is placed onto a second film layer consisting of a semi-crystalline film of Kepstan® 8002 PEKK (Arkema) with a thickness of 50 microns, a melting point of 355° C. and a glass transition temperature of 163° C. The resulting film assembly is laminated under conditions identical to those described in Example 1. The film laminate obtained is expected to have a thickness of 100 microns and to exhibit a good cohesive bonding between the two film layers. The film laminate is expected to exhibit an amorphous state on the first film layer side, and the second film layer is expected to be semi-crystalline.

Example 3 (Prophetic)

A first film layer consisting of an amorphous film of Kepstan® 6002 PEKK (Arkema) with a thickness of 30 microns, a melting point of 295° C. and glass transition temperature of 160° C. is placed onto a second film layer consisting of a semi-crystalline film of Kepstan™ 8002 PEKK (Arkema) with a thickness of 150 microns, a melting point of 355° C. and a glass transition temperature of 163° C. The film assembly is laminated under conditions identical to those described in Example 1. The film laminate obtained is expected to have a thickness of 180 microns, and to exhibit a good cohesive bonding between the two film layers. The film laminate is expected to exhibit an amorphous state on the first film layer side, and the second film layer is expected to be semi-crystalline.

Example 4 (Prophetic)

A first film layer consisting of an amorphous film of Kepstan® 6002 PEKK (Arkema) with a thickness of 50 microns, a melting point of 295° C. and glass transition temperature of 160° C. is placed onto a second film layer consisting of an amorphous film of Kepstan® 7002 PEKK (Arkema) with a thickness of 50 microns, a melting point of 328° C. and a glass transition temperature of 162° C. The film assembly is laminated under conditions identical to those described in Example 1. The film laminate obtained is expected to have a thickness of 100 microns, and to exhibit a good cohesive bonding between the two film layers. The film laminate is expected to exhibit an amorphous state on the first film layer side, and the second film layer is also expected to be amorphous. The film laminate obtained can be further heated in conditions such that the first film layer remains amorphous and the second film layer becomes semi-crystalline.

Example 5 (Prophetic)

A first film layer consisting of an amorphous film of Kepstan® 6002 PEKK (Arkema) with a thickness of 50 microns, a melting point of 295° C. and a glass transition temperature of 160° C. is placed onto a second film layer consisting of an amorphous film of PEEK with a thickness of 100 microns, a melting point of 343° C. and a glass transition temperature of 143° C. The film assembly is laminated under conditions identical to those described in Example 1. The laminate obtained is expected to have a thickness of 150 microns, and to exhibit a good cohesive bonding between the two film layers.

Example 6 (Prophetic)

A first film layer consisting of an amorphous film of PEEK-PEDEK copolymer with a thickness of 20 microns, a melting point of 305° C. and a glass transition temperature of 150° C. is placed onto a second film layer consisting of an amorphous film of PEEK with a thickness of 50 microns, a melting point of 343° C. and a glass transition temperature of 143° C. The film assembly is laminated under conditions identical to those described in Example 1. The laminate obtained is expected to have a thickness of 70 microns, and to exhibit a good cohesive bonding between the two film layers.

What is claimed is:

1. A film laminate comprised of:
   a) a first film layer comprised of a first polyaryletherketone having a melting point not more than 350° C.; and
   b) a second film layer comprised of a second polyaryletherketone having a melting point at least 40° C. higher than the melting point of the first polyaryletherketone;
   wherein the first film layer and the second film layer are directly adhered to each other.

2. The film laminate of claim 1, wherein the melting point of the second polyaryletherketone is at least 50° C. higher than the melting point of the first polyaryletherketone.

3. The film laminate of claim 1, wherein the melting point of the second polyaryletherketone is at least 350° C.

4. The film laminate of claim 1, wherein at least one of the first polyaryletherketone or the second polyaryletherketone is amorphous.

5. The film laminate claim 1, wherein the second polyaryletherketone is semi-crystalline.

6. The film laminate of claim 1, wherein at least one of the first polyaryletherketone and the second polyaryletherketone is a polyetherketoneketone.

7. The film laminate of claim 1, wherein the first polyaryletherketone is a polyetherketoneketone comprising repeating units represented by Formula I and Formula II:

$$-A-C(=O)-X-C(=O)-\qquad\qquad I$$

$$-A-C(=O)-Y-C(=O)-\qquad\qquad II$$

where A is a p,p'-Ph-O-Ph- group, Ph is a phenylene radical, X is p-phenylene and Y is m-phenylene and the repeating units of Formula I and Formula II are present in the first polyaryletherketone in an isomer ratio of Formula I:Formula II of from 50:50 to 72:28.

8. The film laminate of claim 7, wherein the isomer ratio of Formula I :Formula II in the first polyaryletherketone is from 55:45 to 65:35.

9. The film laminate of claim 1, wherein the second polyaryletherketone is a polyetherketoneketone comprising repeating units represented by Formula III and Formula IV:

-A'-C(=O)—X'—C(=O)—    III

-A'-C(=O)—Y'—C(=O)—    IV where A' is a p,p'-Ph-O-Ph- group, Ph is a phenylene radical, X' is p-phenylene and Y' is m-phenylene and the repeating units of Formula III and Formula IV are present in the second polyaryletherketone in an isomer ratio of Formula III:Formula IV of from 100:0 to 67:33.

10. The film laminate of claim 9, wherein the isomer ratio of Formula III:
Formula IV in the second polyaryletherketone is from 85:15 to 75:25.

11. The film laminate of claim 1, wherein the second polyaryletherketone is a polyetheretherketone.

12. The film laminate of claim 1, wherein the first polyaryletherketone is a polyetheretheretherketone or a polyetherdiphenyletherketone-polyetheretherketone copolymer.

13. The film laminate of claim 1, wherein the first film layer has a thickness of from 5 to 100 microns.

14. The film laminate of claim 1, wherein the second film layer has a thickness of from 5 to 200 microns.

15. The film laminate of claim 1, wherein the film laminate has a thickness of from 10 to 300 microns.

16. The film laminate of claim 1, wherein at least one of the first polyaryletherketone or the second polyaryletherketone has a glass transition temperature of at least 120° C.

17. The film laminate of claim 1, wherein:
a) the first polyaryletherketone is a polyetherketoneketone which is amorphous, has a melting point of not more than 315° C., and comprises repeating units represented by Formula I and Formula II:

-A-C(=O)—X—C(=O)—    I

-A-C(=O)—Y—C(=O)—    II where A is a p,p'-Ph-O-Ph- group, Ph is a phenylene radical, X is p-phenylene and Y is m-phenylene and the repeating units of Formula I and Formula II are present in the first polyaryletherketone in an isomer ratio of Formula I : Formula II of from 55:45 to 65:35;

b) the second polyaryletherketone is a polyetherketoneketone which is semi-crystalline, has a melting point of at least 355° C., and comprises repeating units represented by Formula III and Formula IV:

-A'-C(=O)—X'—C(=O)—    III

-A'-C(=O)—Y'—C(=O)—    IV where A' is a p,p'-Ph-O-Ph- group, Ph is a phenylene radical, X' is p-phenylene and Y' is m-phenylene and the repeating units of Formula III and Formula IV are present in the second polyaryletherketone in an isomer ratio of Formula III:Formula IV of from 85:15 to 75:20; and c) the film laminate has a thickness of from 40 to 110 microns.

18. An article comprised of a substrate having a surface and a film laminate in accordance with claim 1, wherein the first film layer is adhered to the surface of the substrate.

19. The article of claim 18, wherein the article is selected from the group consisting of laminated electronic circuits, flexible heaters, insulated wire and cable, radio frequency identification tags and labeled articles.

20. The article of claim 18, wherein the substrate is selected from the group consisting of polymeric substrates, metallic substrates, ceramic substrates and composites thereof.

21. The article of claim 18, wherein the surface of the substrate is comprised of at least one metallic element forming part of a conductor circuit.

22. The article of claim 18, wherein the substrate has a first surface and a second surface and a first portion of the film laminate is adhered to the first surface of the substrate and a second portion of the film laminate is adhered to the second surface of the substrate, the first portion and the second portion of the film laminate cooperating so as to encapsulate the substrate.

23. A method of making an article in accordance with claim 18, comprising heating the first layer of the film laminate to a temperature which is at least as high as the melting point of the first polyaryletherketone but not higher than 20° C. below the melting point of the second polyaryletherketone and contacting the first layer while heated with the surface of the substrate.

24. An article comprised of a substrate having a surface and a film laminate in accordance with claim 17, wherein the first film layer is adhered to the surface of the substrate and the article is selected from the group consisting of laminated electronic circuits, flexible heaters, insulated wire and cable, radio frequency identification tags and labeled articles.

25. A method of making an article in accordance with claim 24, comprising heating the first layer of the film laminate to a temperature which is at least as high as the melting point of the first polyaryletherketone but not higher than 40° C. below the melting point of the second polyaryletherketone and contacting the first layer while heated with the surface of the substrate.

* * * * *